United States Patent [19]

Johannes et al.

[11] Patent Number: 5,269,836
[45] Date of Patent: Dec. 14, 1993

[54] PASSIVE INLINE MEMBRANE DEGASSER AND LIQUEFIER

[75] Inventors: Walter Johannes, Rochester; Daniel J. Wooster, Ontario; Donald E. Eaton, Walworth, all of N.Y.

[73] Assignee: Eastman Kodak Company, Rochester, N.Y.

[21] Appl. No.: 937,636

[22] Filed: Aug. 28, 1992

[51] Int. Cl.$^5$ .............................................. B01D 19/00
[52] U.S. Cl. ............................................ 96/6; 96/194; 96/217
[58] Field of Search .................. 425/203; 55/190, 159, 55/191, 192, 528, 16, 36, 52, 55

[56] References Cited

U.S. PATENT DOCUMENTS

| 2,634,907 | 11/1963 | Parkinson | 210/130 |
|---|---|---|---|
| 2,785,765 | 3/1957 | Cornell | 183/2.5 |
| 3,131,117 | 4/1964 | Hickey | 162/190 |
| 3,228,595 | 1/1966 | Sharples | 233/21 |
| 3,239,998 | 3/1966 | Carter et al. | 55/159 |
| 3,803,061 | 4/1974 | Fabre et al. | 260/12.5 M |
| 3,951,293 | 4/1976 | Schulz | 55/528 |
| 4,578,455 | 3/1986 | Pipper et al. | 528/501 |
| 4,729,773 | 3/1988 | Shirato et al. | 55/158 |
| 4,902,455 | 2/1990 | Wobbe | 264/40 |
| 4,904,285 | 2/1990 | Yamada et al. | 55/191 |
| 4,940,617 | 7/1990 | Baurmeister | 428/36.3 |
| 4,955,992 | 9/1990 | Goodale et al. | 55/160 |
| 4,985,055 | 1/1991 | Thorne et al. | 55/189 |
| 4,986,837 | 1/1991 | Shibata | 55/159 |
| 4,997,464 | 3/1991 | Kopf | 55/170 |
| 5,019,140 | 5/1991 | Bowser | 55/159 |
| 5,045,096 | 9/1991 | Quang et al. | 55/159 |
| 5,053,060 | 10/1991 | Kopf-Sill et al. | 55/16 |
| 5,073,268 | 12/1991 | Saito et al. | 210/638 |

*Primary Examiner*—Robert Spitzer
*Attorney, Agent, or Firm*—Carl F. Ruoff

[57] ABSTRACT

The present invention describes a passive membrane degasser device in which solid chunks of photographic materials (15) are pumped past a hydrophobic membrane (10). Air from in between the chunks is forced through the membrane by pump pressure including a screw auger (11) and a vacuum (12) on the outer side of the membrane. The solid chunks of photographic material (15) are then transferred to a liquefier where conventional ultrasonic deaeration is performed. This device causes no sensitometric problems and permits using a continuous liquefaction system without the use of a centrifugal vacuum degasser.

4 Claims, 2 Drawing Sheets

PASSIVE INLINE MEMBRANE DEGASSER AND LIQUEFIER

FIELD OF THE INVENTION

The present invention describes a method and apparatus for degassing solid chunks of material. More particularly, the present invention degasses gelled photographic material to such an extent that when the gelled chunks are liquefied it is possible to remove the air remaining after liquefication in a conventional manner.

BACKGROUND OF THE INVENTION

Deaeration is an essential process operation in the liquefication and delivery of liquid photographic emulsion to a coating station. In operations where the liquefication step is isolated from the delivery, i.e. a kettle operation, the deaeration requirement of the delivery system is not severe and can generally be handled with ultrasonic equipment.

However, continuous liquefaction systems generally have very high entrained air levels which require complicated equipment such as a centrifugal vacuum degasser to ensure that coating liquids are air-free as delivered to the coating station. Examples of centrifugal degassers are shown in U.S. Pat. Nos. 2,634,907, 2,785,765 and 3,228,595. All of these centrifugal degassers can detrimentally affect the performance of the photographic emulsion. Centrifugal vacuum degassers are high energy devices which have the potential for causing sensitometric shifts in the emulsion they process. Hence, there is a need in continuous liquefication systems to deaerate the photographic material in a way which does not affect the sensitometry.

The present invention offers a unique solution to the problem outlined above. The present invention continually deaerates the gelled photographic material prior to its entering the heat exchanger. This reduces greatly the amount of entrained air within the system and allows deaeration of the liquefied photographic material by conventional means.

SUMMARY OF THE INVENTION

The present invention is a system for degassing photographic emulsion wherein the photographic emulsion is initially in gelled chunk form. The system includes an intake for receiving the gelled chunks of photographic emulsion, a cylindrical vacuum degassing unit which has an input end and an exit end and a hydrophobic membrane having an inner surface and an outer surface positioned between the input end and the exit end. The hydrophobic membrane is supported on its outer surface and its inner surface faces the interior of the vacuum degassing unit. A vacuum is applied to the outer surface of the hydrophobic membrane while an auger moves the solid gelled chunks of photographic emulsion from the intake through the cylindrical vacuum filtration unit. The chunks of photographic material are continuously exposed to the inner surface of the hydrophobic membrane wherein they are degassed. At the exit end of the cylindrical vacuum degassing unit the gelled chunks of photographic material which are degassed are pushed into a heat exchanger so that they may be liquefied.

For a better understanding of the present invention together with other objects, advantages and capabilities thereof, reference is made to the following description and appended claims in connection with the above-described drawings.

DESCRIPTION OF THE PREFERRED EMBODIMENT

Figure 1:
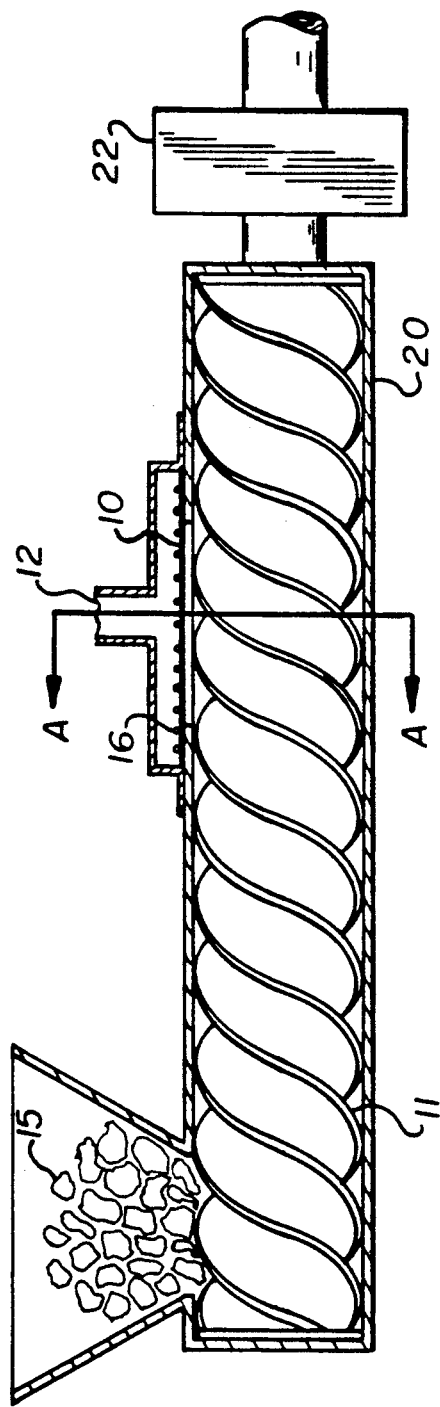
FIG. 1 shows a sectional view of the vacuum degassing apparatus of the present invention.

FIG. 1 shows the passive membrane degasser 20 of the present invention. This degasser includes a hydrophobic membrane 10, an auger 11, and a vacuum means 12. Photographic emulsion 15 in gelled chunk form is loaded into the input end of the vacuum degasser 20. The gelled chunks 15 are pumped by the auger 11 past the inner surface of membrane 10. The auger 11 compresses the mass of gelled chunks 15 and forces air out from between the chunks while continuously wiping the membrane surface 10 clean. The auger also crushes and compacts the chunks thereby removing air from within the chunks. The hydrophobic membrane 10 is a barrier to solids and liquids but allows gas to pass from the inner surface of the membrane to the outer surface of the membrane. GORTEX ®, a fabric made by DuPont, is a material that has been used successfully as the hydrophobic membrane. GORTEX is a polymer material made from polytetrafluoroethylene. A vacuum, drawn on the outer surface of the membrane, removes air from the degasser and thus from between the solid chunks of photographic material.

Figure 2:
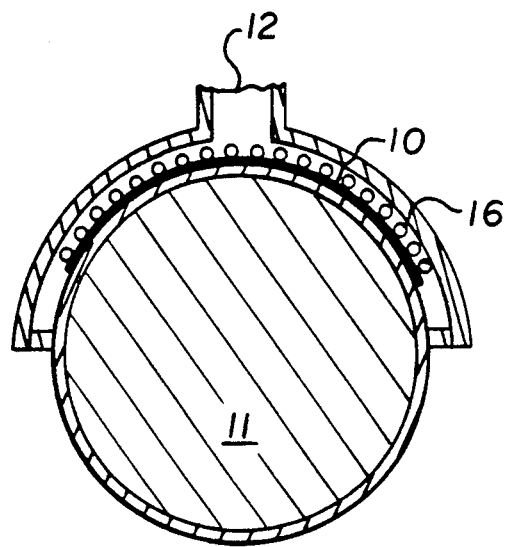
FIG. 2 is a view of the vacuum apparatus of FIG. 1 taken along the line AA.

FIG. 2 shows a sectional view of the apparatus of FIG. 1 along line AA. This figure shows the hydrophobic membrane 10 supported on its outer surface by screen 16. The screen 16 prevents deformation of the membrane which would allow backflow of the gelled photographic material.

In a preferred embodiment of the present invention the hydrophobic membrane had a porosity of approximately 0.02 to about 0.1 micrometers. The vacuum on the outer surface of the membrane was approximately 28 inches Hg. During operation a 55 psi pressure differential across the membrane gave an air removal rate of 0.12 cubic centimeters/minute/cm$^2$ of membrane. Without use of a screw auger this removal rate reduces to zero. The size of the gelled chunks of material was approximately $\frac{1}{4}$" by $\frac{1}{4}$" although larger chunks work as well. After deaeration, the gelled chunks of photographic material are passed to positive displacement pump shown as 22 in FIG. 1 and continuously advanced to a heat exchange means (not shown). In the heat exchange means the gelled photographic material is liquefied.

The present invention is easily incorporated into existing continuous liquefaction systems by modifying the auger sleeve with a hydrophobic membrane sleeve surrounded by a supporting screen. This allows the replacement of the centrifugal vacuum degasser with a conventional ultrasonic degasser due to the decreased deaeration requirements on the liquid emulsion.

While there has been shown and described what are at present considered the preferred embodiments of the invention, it will be obvious to those skilled in the art that various changes and modifications may be made therein without departing from the scope of the invention defined by the appended claims.

What is claimed is:

1. A system for degassing photographic emulsion wherein the photographic emulsion is initially in gelled chunk form comprising:
   a) an intake for receiving the gelled chunk photographic emulsion;
   b) a cylindrical vacuum degassing unit having an input end; and output end; a hydrophobic membrane having an inner surface and an outer surface, the hydrophobic membrane positioned between the input and the output end and being supported on its outer surface, the inner surface of the membrane facing into the degassing unit, the hydrophobic membrane having a pore size of approximately 0.02-0.1 μm; and means for applying a vacuum to the outer surface of the hydrophobic membrane; and
   c) means comprising a screw for moving the solid chunk photographic emulsion from the input end through said cylindrical vacuum degassing unit to the output end wherein the solid chunks are continuously exposed to the inner surface of the hydrophobic membrane.

2. The system according to claim 1 wherein the hydrophobic membrane comprises polytetrafluoroethylene.

3. The system according to claim 1 wherein the screw means comprises an auger.

4. The system according to claim 1 further comprising a positive displacement pump connected to the output end of said vacuum filtration unit wherein the solid chunk emulsion which has passed through the vacuum degassing unit is impelled into subsequent unit operations.

* * * * *